(12) United States Patent
Smith

(10) Patent No.: US 11,647,764 B2
(45) Date of Patent: May 16, 2023

(54) CONFECTIONERY ITEM FOR APPLYING AN EDIBLE TEMPORARY TATTOO TO A PERSON'S TONGUE AND METHOD OF PRODUCING THE CONFECTIONERY ITEM

(71) Applicant: Veronique Smith, Trevallyn (AU)

(72) Inventor: Veronique Smith, Trevallyn (AU)

( * ) Notice: Subject to any disclaimer, the term of this patent is extended or adjusted under 35 U.S.C. 154(b) by 584 days.

(21) Appl. No.: 16/652,562

(22) PCT Filed: Sep. 3, 2018

(86) PCT No.: PCT/AU2018/050949
§ 371 (c)(1),
(2) Date: Mar. 31, 2020

(87) PCT Pub. No.: WO2019/046890
PCT Pub. Date: Mar. 14, 2019

(65) Prior Publication Data
US 2020/0345030 A1 Nov. 5, 2020

(30) Foreign Application Priority Data
Sep. 5, 2017 (AU) .................................. 2017903586

(51) Int. Cl.
| | |
|---|---|
| *A23G 3/54* | (2006.01) |
| *A23P 20/10* | (2016.01) |
| *A23P 20/20* | (2016.01) |
| *B44C 1/16* | (2006.01) |
| *A23G 3/34* | (2006.01) |
| *A23G 3/42* | (2006.01) |
| *A23G 3/56* | (2006.01) |
| *A23P 20/25* | (2016.01) |

(52) U.S. Cl.
CPC .............. *A23G 3/54* (2013.01); *A23G 3/0072* (2013.01); *A23G 3/0097* (2013.01); *A23G 3/343* (2013.01); *A23G 3/42* (2013.01); *A23G 3/563* (2013.01); *A23P 20/105* (2016.08); *A23P 20/20* (2016.08); *B44C 1/16* (2013.01); *A23P 2020/253* (2016.08); *A23V 2002/00* (2013.01)

(58) Field of Classification Search
None
See application file for complete search history.

(56) References Cited

U.S. PATENT DOCUMENTS

| | | |
|---|---|---|
| 6,893,671 B2 | 5/2005 | Yoseph et al. |
| 2003/0215593 A1 | 11/2003 | Morgan et al. |
| 2004/0131740 A1 | 7/2004 | Woodhouse et al. |
| 2008/0305219 A1 | 12/2008 | Stewart |

FOREIGN PATENT DOCUMENTS

WO 2010118289 A1 10/2010

OTHER PUBLICATIONS

Amos She Qu Tattoo Lollipops (Mintel GNPD ID: 1332720) published Jun. 2010, URL: https://www.gnpd.com/sinatra/recordpage/1332720/?utm_source=download&utm_medium=rft, retrieved from Internet Oct. 30, 2018, 2 pages.
Boavistense Pop Tattoo Raspberry Flavored Lollipops (Mintel GNPD ID: 4711963), published Mar. 2017, URL: https://www.gnpd.com/sinatra/recordpage/4711963/?utm_source=download&utm_medium=rtf, retrieved from Internet Oct. 30, 2018, 3 pages.
"Edible Image Lollipops/Suckers—CakeCentral.com", May 15, 2008, URL: https://www.cakecentral.com/forum/t/586812/edible-image-lollipops-suckers, retrieved from Internet Oct. 31, 2018, 7 pages.
Tongue Tattoo Santa Pops (Mintel GNPD ID: 10200616), published Dec. 2004, URL: https://www.gnpd.com/sinatra/recordpage/10200616/?utm_source=download&utm_medium=rtf, retrieved from Internet Oct. 20, 2018, 2 pages.
International Search Report dated Nov. 6, 2018 for PCT/AU2018/050949.

*Primary Examiner* — Jyoti Chawla
(74) *Attorney, Agent, or Firm* — Suiter Swantz pc llo

(57) ABSTRACT

A confectionery item for applying an edible temporary tattoo to a person's tongue, including a release medium and an edible substrate configured to be insertable into the person's mouth, the release medium being securable to the substrate and coated with a layer of edible hardener onto which a transfer is printed, wherein the transfer is a representation formed of edible ink printed onto the layer of edible hardener and configured to be transferred to the person's tongue during contact therewith.

11 Claims, 1 Drawing Sheet

CONFECTIONERY ITEM FOR APPLYING AN EDIBLE TEMPORARY TATTOO TO A PERSON'S TONGUE AND METHOD OF PRODUCING THE CONFECTIONERY ITEM

FIELD OF THE INVENTION

The present invention relates to confectionery item for applying an edible temporary tattoo to a person's tongue and a method of producing such a confectionery item.

BACKGROUND

Temporary tongue tattoos are used for many reasons, such as for example, providing temporary visual adornment or decoration to allow a person to modify their appearance or communicate a message as desired. Also, they can simply be fun for a user.

Temporary tongue tattoos have previously been proposed in U.S. Pat. No. 7,435,439. However, temporary tongue tattoos formed by the disclosed method can be difficult to transfer cleanly and typically appear blurry once transferred onto a person's tongue, thereby reducing the novelty attraction of the product. They can also be inconvenient to apply.

Furthermore, the disclosed temporary tattoos are formed of many layers, thereby making manufacture more complicated than desirable.

There is a need to address the above, and/or at least provide a useful alternative.

SUMMARY

According to the invention, there is provided a confectionery item for applying an edible temporary tattoo to a person's tongue, including a release medium and an edible substrate configured to be insertable into the person's mouth, the release medium being securable to the substrate and coated with a layer of edible hardener onto which a transfer is printed, wherein the transfer is a representation formed of edible ink printed onto the layer of edible hardener and configured to be transferred to the person's tongue during contact therewith.

In preferred embodiments, the hardener is a cellulose based hardener. Preferably, the hardener includes at least one of the following: Methylhydroxyethal Cellulose, Methylhydroxypropyl Cellulose, Hydroxyethal Cellulose, 2R,3S,4R,5R-Pentahydroxyhexanol (Glucose), Amylopectin (Starch), E466 and water.

Preferably, the release medium is in the form of a sheet confectionery configured for use in an edible ink printer. Preferably, the release medium is formed of icing. The substrate is preferably formed of a sugar based compound. The substrate can be a confectionery item such as a lollipop formed on a stick.

There is also provided herein a method of producing a confectionery item for applying an edible temporary tattoo to a person's tongue, including the steps of:

providing an edible substrate configured to be insertable into a person's mouth;

providing a release medium and coating it with an edible hardener, the release medium being securable to the substrate; and printing a transfer onto the release medium, wherein the transfer is a representation formed of edible ink printed onto the layer of edible hardener and configured to be transferred to the person's tongue during contact therewith.

According to preferred embodiments, the hardener is a cellulose based hardener. Preferably, the hardener includes at least one of the following: Methylhydroxyethal Cellulose, Methylhydroxypropyl Cellulose, Hydroxyethal Cellulose, 2R,3S,4R,5R-Pentahydroxyhexanol (Glucose), Amylopectin (Starch), E466 and water.

The transfer can be printed onto the release medium with an edible ink printer. Preferably, the substrate is a moulded confectionery item. After the transfer is printed, the release medium can be placed transfer down into a mould and the confectionery item poured over the release medium.

BRIEF DESCRIPTION OF THE DRAWINGS

In order that the invention may be more easily understood, an embodiment will now be described, by way of example only, with reference to the accompanying drawings, in which.

DETAILED DESCRIPTION

Figure 1:
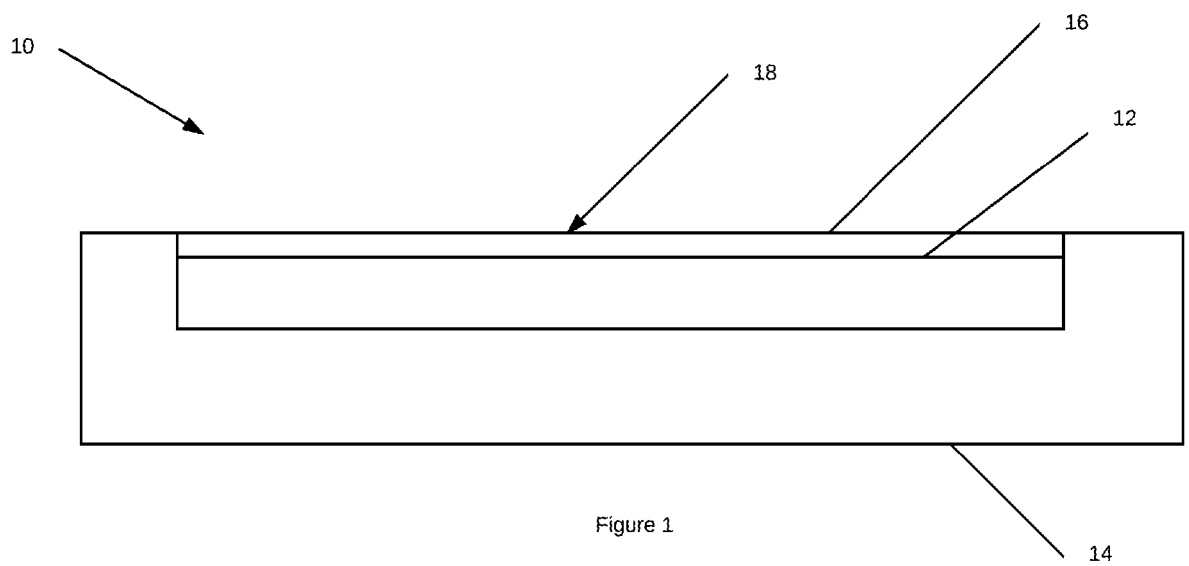
FIG. 1: is a close cross sectional illustration of a confectionery item according to a preferred embodiment of the invention.
Figure 2:
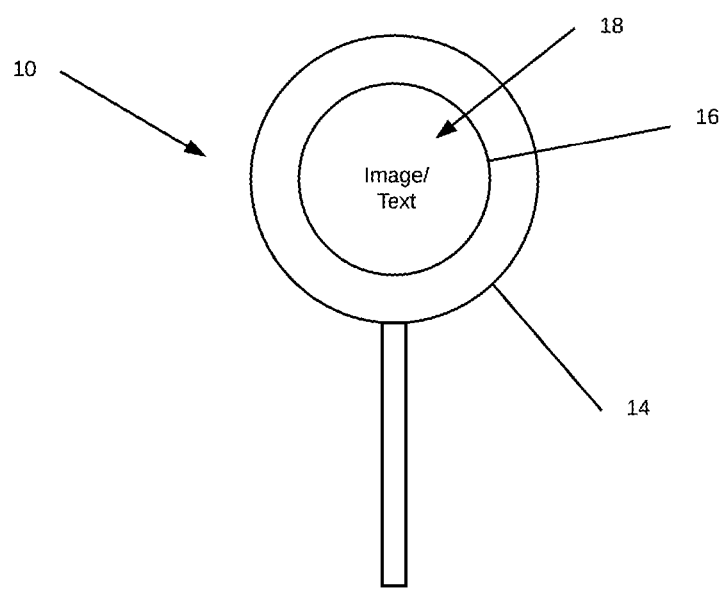
FIG. 2: is a plan view of the confectionery item.

FIGS. 1 and 2 illustrate a confectionery item 10 according to a preferred embodiment of the invention. The confectionery item 10 is configured for applying an edible temporary tattoo to a person's tongue The confectionery item 10 includes a release medium 12 and an edible substrate 14 configured to be insertable into the person's mouth. The release medium 12 is securable to the substrate 14 and coated with a layer of edible hardener 16 onto which a transfer 18 is printed. The substrate 14 allows the transfer 18 to be positioned within a person's mouth and onto a person's tongue as desired.

The transfer 18 is a temporary tattoo and includes a representation formed of non-toxic edible ink printed onto the layer of edible hardener 16 and configured to be transferred to the person's tongue during contact therewith. The edible ink may be flavoured or covered with a flavouring agent if desired. The representation may include text and/or images and may, for example, be an image of a cartoon character, a sponsors logo, the colours of a football team or another visually appealing representation. Advantageously, the item 10 can be used as a promotional item at events or for team merchandise.

Previously, it has been difficult to obtain a clean transfer of a temporary tattoo image with the result being undesirable in that a blurry image is formed on a person's tongue. The inventor has found that by printing the transfer onto a substrate coated with a layer of edible hardener, a clean image can be transferred with clear details, allowing a temporary tattoo with greater visual details to be formed. Also, such a transfer can be printed with an ordinary edible ink printer, thereby simplifying the manufacturing process.

It will be understood that various edible hardeners, such as gum based hardeners, may be suitable for use with the present invention, however, the inventor has found that a cellulose based hardener provides particularly advantageous results. Particularly good results have been obtained with a hardener including at least one of the following ingredients: Methylhydroxyethal Cellulose, Methylhydroxypropyl Cellulose, Hydroxyethal Cellulose, 2R,3S,4R,5R-Pentahydroxyhexanol (Glucose), Amylopectin (Starch), E466 and water. A hardened containing each of these ingredients is marketed as MagicGel under the Rolkem trade mark.

The release medium 12 provides a surface on which the transfer can be printed. The release medium 12 can take different forms, such as edible paper or other food products, though it is preferably in the form of a sheet confectionery configured for use in an edible ink printer. An example of such an item is icing, which is commercially available and can be printed on with a conventional edible ink printer. Advantageously, the confectionary item 10 can be formed cost effectively using commercially available equipment and ingredients.

The release medium 12 is secured to the substrate 14 to enable the transfer to be manipulated and applied to a person's tongue. Securement may be achieved by applying an adhesive between the release medium 12 and the substrate 14, or by a co-moulding process in which the release medium 12 is placed inside a mould for forming the substrate 14 so that setting or curing of the substrate 14 results in adhesion of the release medium 12 and the substrate 14.

Preferably, the substrate 14 demonstrates some rigidity so that a user can accurately place the transfer on a person's tongue. Although illustrated as being round, the substrate may take other regular shapes, such as triangular or rectangular, or be formed of an irregular shape which may correspond to the configuration of the transfer. Similarly, the release medium 12 may also take other shapes.

In one form, the substrate 14 is a hard confectionery item such as a lollipop formed on a stick. Although described as a lollipop, the confectionery item may take other forms of edible candy on a stick. It will also be appreciated that the substrate 14 need not be formed on a stick. In this regard, the substrate may take an elongate shape or be formed on something that is not sticklike.

Figure 3:
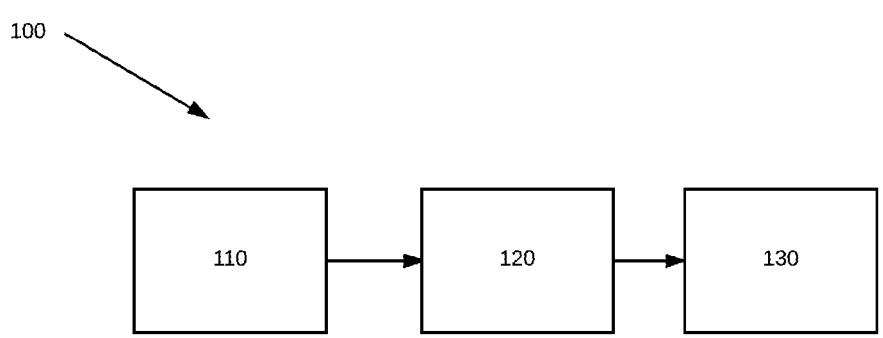
FIG. 3: is a flow chart illustrating the steps in producing a confectionery item according to a preferred embodiment of the invention.

FIG. 3 is a flow chart illustrating a process 100 of producing a confectionery item for applying an edible temporary tattoo to a person's tongue.

Process 100 includes the following steps:

110 providing an edible substrate configured to be insertable into a person's mouth;

120 providing a release medium which is securable to the substrate and coating it with an edible hardener; and 130 printing a transfer onto the release medium.

In process 100, the transfer is a representation formed of edible ink printed onto the layer of edible hardener and configured to be transferred to the person's tongue during contact therewith. Also, the hardener is a cellulose based hardener, which may include at least one, though preferably all, of the following: Methylhydroxyethal Cellulose, Methylhydroxypropyl Cellulose, Hydroxyethal Cellulose, 2R,3S,4R,5R-Pentahydronthexanol (Glucose), Amylopectin (Starch), E466 and water. A commercial example of such a product is Magic Gel, marketer under the trade mark Rolkem.

Within step 120, the edible hardener is painted onto the release medium with a paint brush and then smoothed with a spatula to obtain an even surface which can be printed on. It will be appreciated that the hardener may be applied with other methods, such as spraying for example. After application, the edible hardener is allowed to dry for 24 hours at room temperature or placed within a dehydrator for 4 hours.

In step 130, the transfer is printed onto the release medium with an edible ink printer. Preferably, an A4 sheet of icing is used and passed through the printer, printing a number of images onto the sheet. Each individual image can then be trimmed from the sheet for application to a substrate.

In step 110, the edible substrate is a moulded confectionery item. The edible substrate is preferably formed of a sugar mixture comprising sugar, water, cream of tartar, cornflour and moulded. In moulding the substrate, the release medium and substrate can be secured together. In this regard, after the transfer is printed, the release medium is placed transfer down into the mould and the sugar mix poured over the release medium. After the sugar mix is set, which will typically take 20 minutes, the formed lollipop can be removed from the mould for packaging.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A confectionery item for applying an edible temporary tattoo to a person's tongue, including a release medium and an edible substrate configured to be insertable into the person's mouth, the release medium being securable to the substrate and coated with a layer of edible hardener onto which a transfer is printed, wherein the transfer is a representation formed of edible ink printed onto the layer of edible hardener and configured to be transferred to the person's tongue during contact therewith, wherein the hardener includes at least one of the following: Methylhydroxyethal Cellulose, Methylhydroxypropyl Cellulose, Hydroxyethal Cellulose, 2R,3S,4R,5R-Pentahydroxyhexanol (Glucose), Amylopectin (Starch), E466 and water.

2. A confectionery item according to claim 1, wherein the hardener is a cellulose based hardener.

3. A confectionery item according to claim 1, wherein the release medium is in the form of a sheet confectionery configured for use in an edible ink printer.

4. A confectionery item according to claim 3, wherein the release medium is formed of icing.

5. A confectionery item according to claim 1, wherein the substrate is formed of a sugar based compound.

6. A confectionery item according to claim 1, wherein the substrate is a confectionery item such as a lollipop formed on a stick.

7. A method of producing a confectionery item for applying an edible temporary tattoo to a person's tongue, including the steps of: providing an edible substrate configured to be insertable into a person's mouth; providing a release medium and coating it with an edible hardener, the release medium being securable to the substrate; and printing a transfer onto the release medium, wherein the transfer is a representation formed of edible ink printed onto the layer of edible hardener and configured to be transferred to the person's tongue during contact therewith, wherein the hardener includes at least one of the following: Methylhydroxyethal Cellulose, Methylhydroxypropyl Cellulose, Hydroxyethal Cellulose, 2R,3S,4R,5R-Pentahydroxyhexanol (Glucose), Amylopectin (Starch), E466 and water.

8. A method according to claim 7, wherein the hardener is a cellulose based hardener.

9. A method according to claim 7, wherein the transfer is printed onto the release medium with an edible ink printer.

10. A method according to claim 7, wherein the substrate is a moulded confectionery item.

11. A method according to claim 10, wherein after the transfer is printed, the release medium is placed transfer down into a mould and the confectionery item poured over the release medium.

\* \* \* \* \*